(12) United States Patent
Karpenko et al.

(10) Patent No.: US 9,524,575 B2
(45) Date of Patent: Dec. 20, 2016

(54) SYSTEMS AND METHODS FOR COMBINING MULTIPLE FRAMES TO PRODUCE MEDIA CONTENT WITH SIMULATED EXPOSURE EFFECTS

(71) Applicant: Facebook, Inc., Menlo Park, CA (US)

(72) Inventors: Alexandre Karpenko, Palo Alto, CA (US); Thomas Dimson, Stanford, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/573,355

(22) Filed: Dec. 17, 2014

(65) Prior Publication Data
US 2016/0180559 A1 Jun. 23, 2016

(51) Int. Cl.
*G06T 11/60* (2006.01)
*H04N 5/225* (2006.01)
*G06T 5/00* (2006.01)
*G06K 9/20* (2006.01)

(52) U.S. Cl.
CPC .............. *G06T 11/60* (2013.01); *G06T 5/00* (2013.01); *H04N 5/225* (2013.01); *G06K 2009/2045* (2013.01)

(58) Field of Classification Search
CPC .......... G06T 11/60; G06T 5/00; H04N 5/225; G06K 2009/2045
See application file for complete search history.

(56) References Cited

U.S. PATENT DOCUMENTS

| | | | | |
|---|---|---|---|---|
| 8,760,513 B2* | 6/2014 | Strine | ........................ | G06T 7/20 348/143 |
| 2012/0062739 A1* | 3/2012 | Large | ........................ | B60R 1/00 348/143 |
| 2012/0148216 A1* | 6/2012 | Pavagada | ............... | H04N 5/772 386/278 |
| 2015/0248916 A1* | 9/2015 | Kopf | .................... | G11B 27/034 386/278 |

OTHER PUBLICATIONS

Karpenko, Alexandre, David Jacobs, Jongmin Baek, and Marc Levoy. "Digital video stabilization and rolling shutter correction using gyroscopes." CSTR 1 (2011): 2.*
Telleen, Jacob et al., "Synthetic Shutter Speed Imaging," Computer Graphics Forum, vol. 26, No. 3, pp. 591-598, 2007.

* cited by examiner

*Primary Examiner* — Siamak Harandi
*Assistant Examiner* — Amandeep Saini
(74) *Attorney, Agent, or Firm* — Sheppard Mullin Richter & Hampton LLP

(57) ABSTRACT

Systems, methods, and non-transitory computer-readable media can capture media content including an original set of frames. A plurality of subsets of frames can be identified, based on a subset selection input, out of the original set of frames. An orientation-based image stabilization process can be applied to each subset in the plurality of subsets of frames to produce a plurality of stabilized subsets of frames. Multiple frames within each stabilized subset in the plurality of stabilized subsets of frames can be combined to produce a plurality of combined frames. Each stabilized subset of frames can be utilized to produce a respective combined frame in the plurality of combined frames. A time-lapse media content item can be provided based on the plurality of combined frames.

20 Claims, 8 Drawing Sheets

SYSTEMS AND METHODS FOR COMBINING MULTIPLE FRAMES TO PRODUCE MEDIA CONTENT WITH SIMULATED EXPOSURE EFFECTS

FIELD OF THE INVENTION

The present technology relates to the field of media content. More particularly, the present technology relates to techniques for combining multiple frames to produce media content with simulated exposure effects.

BACKGROUND

Today, people often utilize computing devices (or systems) for a wide variety of purposes. Users can use their computing devices to, for example, interact with one another, create content, share information, and access information. In some instances, a user of a computing device can utilize a camera or other image sensor of the computing device (or system) to capture or record media content, such as images and/or videos.

In one example, under conventional approaches, the user can utilize the camera to create media content with certain camera or photography effects, such as an long exposure effect. In this example, the user has to manually configure and stabilize the camera to produce suitable media content with the long exposure effect. In one example, under conventional approaches, the user can utilize the camera to create a time-lapse video including image frames or still frames captured at different time intervals. If the time-lapse video incorporates a moving object, then the movements of the object will appear to be choppy or unsmooth due to the frames of the time-lapse video being captured at different time intervals. As a result, viewing the moving object within the time-lapse video can be unpleasant, unsatisfying, uninteresting, or otherwise undesirable. Due to these and other reasons, conventional approaches can create challenges for or reduce the overall user experience associated with utilizing computing devices (or systems) to produce media content.

SUMMARY

Various embodiments of the present disclosure can include systems, methods, and non-transitory computer readable media configured to capture media content including an original set of frames. A plurality of subsets of frames can be identified, based on a subset selection input, out of the original set of frames. An orientation-based image stabilization process can be applied to each subset in the plurality of subsets of frames to produce a plurality of stabilized subsets of frames. Multiple frames within each stabilized subset in the plurality of stabilized subsets of frames can be combined to produce a plurality of combined frames. Each stabilized subset of frames can be utilized to produce a respective combined frame in the plurality of combined frames. A time-lapse media content item can be provided based on the plurality of combined frames.

In an embodiment, the applying of the orientation-based image stabilization process to each subset in the plurality of subsets of frames to produce the plurality of stabilized subsets of frames can further comprise acquiring timestamps for multiple frames within each subset in the plurality of subsets of frames. Camera orientation data for a camera utilized to capture the media content including the original set of frames can be acquired. The camera orientation data can be associated with the timestamps for the multiple frames within each subset. A smoothed set of camera orientation data can be generated by minimizing a rate of rotation between successive frames within each subset while minimizing empty regions below a threshold. The multiple frames within each subset can be warped based on the smoothed set of camera orientation data to produce each stabilized subset in the plurality of stabilized subsets of frames.

In an embodiment, the orientation-based image stabilization process can cause the multiple frames within each subset to be aligned relative to at least one of a respective first frame of the multiple frames within each subset or a specified alignment.

In an embodiment, the camera can incur undesirable motion while capturing the media content including the original set of frames. The orientation-based image stabilization process can reduce instability, caused by the undesirable motion, with respect to each subset in the plurality of subsets of frames.

In an embodiment, the subset selection input can indicate a quantity of frames. The subset selection input can cause each subset in the plurality of subsets to include the quantity of frames.

In an embodiment, the quantity of frames can be greater than one.

In an embodiment, a moving object can be represented in at least one stabilized subset in the plurality of stabilized subsets. The combining of the multiple frames within each stabilized subset can comprise combining multiple frames within the at least one stabilized subset. The combining of the multiple frames within the at least one stabilized subset can cause one or more motion trails associated with the moving object to appear in a combined framed produced based on the at least one stabilized subset.

In an embodiment, the combining of the multiple frames within each stabilized subset in the plurality of stabilized subsets of frames to produce the plurality of combined frames can further comprise blending pixels included in the multiple frames within each stabilized subset.

In an embodiment, the blending of the pixels included in the multiple frames within each stabilized subset can further comprise calculating at least one of average pixel values for the pixels included in the multiple frames within each stabilized subset, maximum pixel values for the pixels included in the multiple frames within each stabilized subset, or minimum pixel values for the pixels included in the multiple frames within each stabilized subset.

In an embodiment, the subset selection input can correspond to at least one of a user command or a system setting. The subset selection input can be received prior to at least one of the capturing of the media content including the original set of frames or the providing of the time-lapse media content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
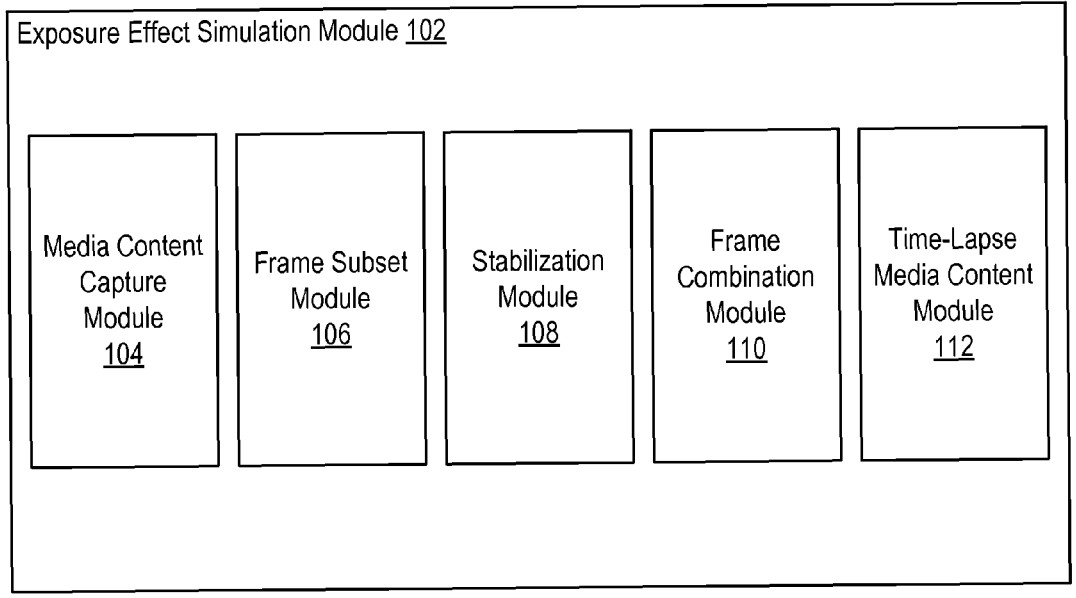
FIG. 1 illustrates an example system including an example exposure effect simulation module configured to facilitate combining multiple frames to produce media content with simulated exposure effects, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Combining Multiple Frames to Produce Media Content with Simulated Exposure Effects People use computing devices (or systems) for a wide variety of purposes. Computing devices can provide different kinds of functionality. Users can utilize their computing devices to produce information, access information, and share information. In some cases, computing devices can include or correspond to cameras capable of capturing or recording media content, such as images or videos.

In some instances, a user of a computing device including a camera may desire to produce media content with particular camera or photography effects, such as those associated with long exposure or time exposure photography. In one example, in order to achieve long exposure photography effects under conventional approaches, the user has to set the shutter speed of the camera to an appropriate speed and has to ensure that the camera is sufficiently stable to capture a meaningful media content item having the long exposure photography effects. However, such efforts by the user in accordance with conventional approaches can be inconvenient, difficult and/or inefficient.

In another example, under conventional approaches, the user can utilize the camera to create a time-lapse media content, such as a time-lapse video. The time-lapse video can include image frames or still frames that were captured at different times, such as at set time intervals. If the time-lapse video incorporates the moving object, then one or more movements of the object will appear to be choppy or unsmooth due to the frames of the time-lapse video being captured at different times. As a result, under conventional approaches, viewing the moving object within the time-lapse video can be unpleasant, unsatisfying, uninteresting, or otherwise undesirable.

As such, these and other similar conventional approaches can be inefficient, uninteresting, and ineffective. Therefore, an improved approach can be beneficial for addressing or alleviating various concerns associated with conventional approaches. The disclosed technology facilitates combining multiple frames to produce media content with simulated exposure effects. Various embodiments of the present disclosure can capture media content including an original set of frames. A plurality of subsets of frames can be identified, based on a subset selection input, out of the original set of frames. An orientation-based image stabilization process can be applied to each subset in the plurality of subsets of frames to produce a plurality of stabilized subsets of frames. Multiple frames within each stabilized subset in the plurality of stabilized subsets of frames can be combined to produce a plurality of combined frames. Each stabilized subset of frames can be utilized to produce a respective combined frame in the plurality of combined frames. A time-lapse media content item can be provided based on the plurality of combined frames. It is contemplated that there can be many variations and/or other possibilities.

FIG. 1 illustrates an example system 100 including an example exposure effect simulation module 102 configured to facilitate combining multiple frames to produce media content with simulated exposure effects, according to an embodiment of the present disclosure. As shown in the example of FIG. 1, the exposure effect simulation module 102 can include a media content capture module 104, a frame subset module 106, a stabilization module 108, a frame combination module 110, and a time-lapse media content module 112. The components (e.g., modules, elements, etc.) shown in this figure and all figures herein are exemplary only, and other implementations may include additional, fewer, integrated, or different components. Some components may not be shown so as not to obscure relevant details.

In some embodiments, the exposure effect simulation module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the exposure effect simulation module 102 can be implemented, in part or in whole, as software running on one or more computing devices or systems, such as on a user or client computing device. For example, the exposure effect simulation module 102 can be implemented as or within an application (e.g., app), a program, or an applet, etc., running on a user computing device or a client computing system. In another example, the exposure effect simulation module 102 can be implemented using one or more computing devices or systems that include one or more servers, such as network servers or cloud servers. In some instances, the exposure effect simulation module 102 can, in part or in whole, be implemented within or configured to operate in conjunction with a social networking system (or service), such as the social networking system 730 of FIG. 7. It should be understood that there can be many variations or other possibilities.

The media content capture module 104 can be configured to facilitate capturing media content including an original set of frames. In some embodiments, the media content capture module 104 can be configured to operate with a camera utilized by or otherwise associated with the exposure effect simulation module 102. The media content capture module 104 can cause the camera to capture media content, such as a video or a series of images (e.g., image frames, still frames, etc.). The images or still frames can correspond to the original set of frames. In one example, the media content including the original set of frames can be captured or recorded at 24 frames per second, 30 frames per second, 60 frames per second, 120 frames per second, or another suitable rate.

The frame subset module 106 can be configured to facilitate identifying, based on a subset selection input, a plurality of subsets of frames out of the original set of frames. In some embodiments, the subset selection input can correspond to at least one of a user command or a system setting. The subset selection input can indicate a quantity of frames and can cause each subset in the plurality of subsets to include the quantity of frames. In some cases, the quantity of frames can be greater than one. In one example, if there are 100 frames in the original set of frames and the subset selection input indicates a quantity of four, then the frame subset module 106 can identify 25 subsets of frames, where each subset includes four frames. The first subset would be identified to include the first through fourth frames out of the original set of 100 frames, the second subset would be identified to include the fifth through eighth frames out of the original set, the third subset would be identified to include the ninth through twelfth frames, and so forth. In another example, if there are 27 frames in the original set and the subset selection input indicates a quantity of five, then the frame subset module 106 can identify six subsets of frames, where the first five subsets each include five frames and the six subset includes two frames. Many variations are possible.

The stabilization module 108 can be configured to facilitate applying an orientation-based image stabilization process to each subset in the plurality of subsets of frames to produce a plurality of stabilized subsets of frames. In some cases, the orientation-based image stabilization process applied by the stabilization module 108 can involve acquiring timestamps for multiple frames within each subset in the plurality of subsets of frames. Camera orientation data for a camera utilized to capture the media content including the original set of frames can also be acquired. The stabilization module 108 can acquire camera orientation data that is associated with the timestamps for the multiple frames within each subset. In some implementations, orientation data can be acquired from one or more orientation sensors. In general, an orientation sensor can include any sensor or component configured to acquire, determine, detect, obtain, and/or receive data from which a device (or system) orientation can be derived, deduced, inferred, and/or approximated. For example, even though an accelerometer technically measures or acquires acceleration data, the acceleration data can be utilized, alone or in conjunction with other information, to determine an orientation or change in orientation for a computing device (or system) that includes the accelerometer. Accordingly, the one or more orientation sensors can include, but are not limited to, an accelerometer, a gyroscope, a magnetometer, a barometer, and/or a compass, etc.

Furthermore, the orientation-based image stabilization process applied by the stabilization module 108 can include generating a smoothed set of camera orientation data by minimizing a rate of rotation between successive frames within each subset while minimizing empty regions below a threshold. Furthermore, the orientation-based image stabilization process applied by the stabilization module 108 can warp, rotate, skew, adjust, or otherwise modify the multiple frames within each subset based on the smoothed set of camera orientation data to produce each stabilized subset in the plurality of stabilized subsets of frames. It should be appreciated that there can be many variations, applications, and/or other possibilities. For example, in some embodiments, the orientation-based image stabilization process utilized by the stabilization module 108 can cause the multiple frames within each subset to be aligned relative to a respective first frame of the multiple frames within each subset and/or relative to a specified alignment (e.g., default alignment).

In some implementations, the orientation-based image stabilization process utilized by the stabilization module 108 can apply adaptive zoom with respect to each subset in the plurality of subsets to produce each stabilized subset in the plurality of stabilized subsets. The adaptive zoom can, for example, be dependent upon the camera orientation data. In some cases, the adaptive zoom can include a technique for cropping or zooming frames, such as the subset of frames identified from the original set of frames. The adaptive zoom can allow individual frames to be translated, rotated, or warped to counteract undesired deformations introduced by hand shake or other undesirable changes in orientation. The amount of cropping or zooming can determine how much leeway (or "wiggle room") is available to remove or reduce these deformations. If, for example, a particular frame is translated too far, empty regions (e.g., regions which have no pixel data) can be visible. The orientation-based image stabilization process can smooth out undesirable camera shake or other motion by counteracting changes in camera orientation, and can do so while preventing empty regions from showing up. The adaptive zoom can attempt to achieve an optimal or suitable zoom depending on the changes in orientation.

For example, if the camera had undergone significant orientation changes, such as rotations (e.g., clockwise and/or counterclockwise relative to a lens of the camera), while capturing the media content, then the adaptive zoom can increase the zooming or cropping of the frames in the identified subset. If, however, the camera had undergone slight orientation changes (e.g., rotations), then the adaptive zoom can utilize a lesser zooming or cropping of the frames in the identified subset. Accordingly, when the camera incurs undesirable motion while capturing the media content including the original set of frames, the orientation-based image stabilization process can utilize the adaptive zoom to reduce instability, caused by the undesirable motion, with respect to each subset in the plurality of subsets of frames. There can be many variations and other possibilities.

Moreover, the frame combination module 110 can be configured to facilitate combining multiple frames within each stabilized subset in the plurality of stabilized subsets of frames to produce a plurality of combined frames. Each stabilized subset of frames can be utilized to produce a respective combined frame in the plurality of combined frames. The frame combination module 110 will be described in more detail below with reference to FIG. 2.

The time-lapse media content module 112 can be configured to facilitate providing a time-lapse media content item based on the plurality of combined frames. In some implementations, the time-lapse media content module 112 can accumulate, assemble, or otherwise process the plurality of combined frames to generate the time-lapse media content item. For example, the time-lapse media content module 110 can sequentially assemble each combined frame in the plurality of combined frames to produce the time-lapse media content item. The time-lapse media content module 110 can also present or display the time-lapse media content item.

In some cases, the time-lapse media content item can correspond to a hyperlapse media content item. For example, when the media content including the original set of frames is captured while the camera is moved across a distance over a duration of time, the time-lapse media content item can be produced as a hyperlapse media content item. Many variations are possible.

Figure 2:
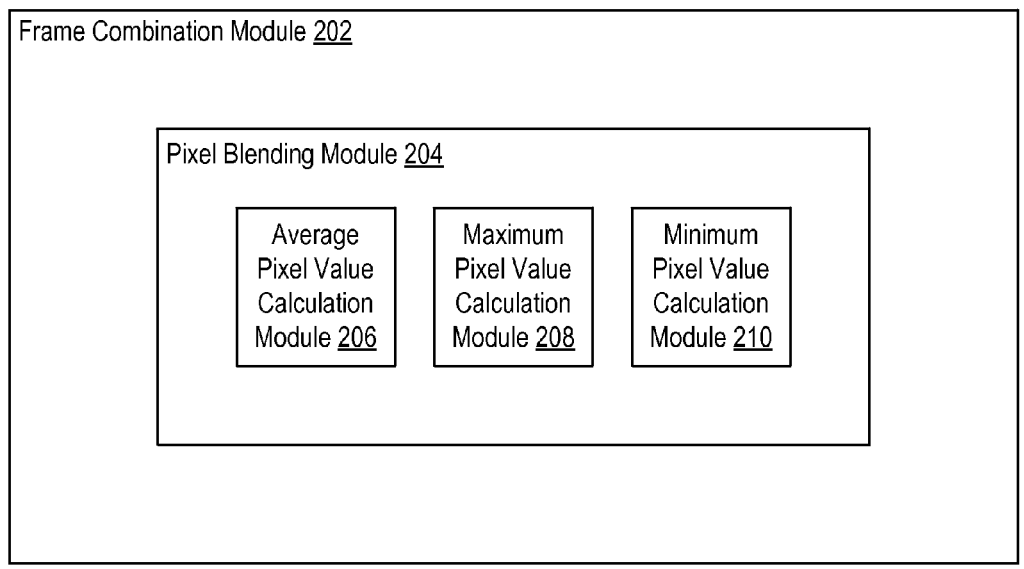
FIG. 2 illustrates an example frame combination module configured to facilitate combining multiple frames to produce media content with simulated exposure effects, according to an embodiment of the present disclosure.

FIG. 2 illustrates an example frame combination module 202 configured to facilitate combining multiple frames to produce media content with simulated exposure effects, according to an embodiment of the present disclosure. In some embodiments, the frame combination module 110 of FIG. 1 can be implemented as the example frame combination module 202. As discussed above, the example frame combination module 202 can be configured to combine multiple frames within each stabilized subset in the plurality of stabilized subsets of frames to produce a plurality of combined frames, where each stabilized subset of frames is utilized to produce a respective combined frame in the plurality of combined frames. As shown in the example of FIG. 2, the frame combination module 202 can include a pixel blending module 204.

Since the multiple frames have been stabilized (and/or aligned) within each stabilized subset, as discussed previously, any unintentional or undesirable camera shake or other motion can be reduced or removed. As such, the combining of the multiple frames within each stabilized subset can produce a combined frame that shows motion trails (e.g., light trails) for objects that have moved between one frame to the next frame in the multiple frames, which can simulate one or more effects of long exposure photography or time exposure photography. In one example, a moving object can be represented in or captured by at least one stabilized subset in the plurality of stabilized subsets. Multiple frames within the at least one stabilized subset can be combined. The combining of the multiple frames within the at least one stabilized subset can cause one or more motion trails associated with the moving object to appear in a combined framed produced based on the at least one stabilized subset. In another example, if there are no moving objects represented in or captured by the multiple frames of a particular stabilized subset, then the multiple frames of the particular stabilized subset will be the same or substantially similar. Accordingly, a combined frame produced from the particular stabilized subset will be the same as or substantially similar to the multiple frames, each of which is also the same as or substantially similar to the other frames.

In some embodiments, the frame combination module 202 can combine the multiple frames within each stabilized subset to produce the plurality of combined frames by blending pixels included in the multiple frames within each stabilized subset. For example, the frame combination module 202 can cause the pixel blending module 204 to blend the pixels included in the multiple frames within each stabilized subset. In some implementations, the pixel blending module 204 can include an average pixel value calculation module 206, a maximum pixel value calculation module 208, and a minimum pixel value calculation module 210.

The average pixel value calculation module 206 can be configured to calculate average pixel values for the pixels included in the multiple frames within each stabilized subset. For example, if there are four frames within each stabilized subset, the average pixel value calculation module 206 can analyze pixel values for the first pixel (e.g., highest leftmost pixel) in each of the four frames of the first stabilized subset. The average pixel value calculation module 206 can calculate a first average pixel value for those four first (e.g., highest leftmost) pixels from the four frames of the first stabilized subset. In some cases, the first average pixel value can, for example, correspond to a first average RGB pixel value calculated based on the RGB pixel values of those four first pixels. The first average pixel value can be utilized to form a first (e.g., highest leftmost) pixel for a combined frame produced from the four frames of the first stabilized subset. The average pixel value calculation module 206 can repeat this process for each pixel in the four frames of the first stabilized subset to produce the combined frame. Additionally, the average pixel value calculation module 206 can repeat this process for each stabilized subset in the plurality of stabilized subsets to produce the plurality of combined frames.

Moreover, the maximum pixel value calculation module 208 can be configured to calculate maximum pixel values for the pixels included in the multiple frames within each stabilized subset. The maximum pixel value calculation module 208 can, for example, produce combined frames that have the brightest pixels selected out of each combined frame's respective stabilized subset of frames. Further, the minimum pixel value calculation module 210 can be configured to calculate minimum pixel values for the pixels included in the multiple frames within each stabilized subset. The minimum pixel value calculation module 210 can, for example, produce combined frames that have the darkest pixels selected out of each combined frame's respective stabilized subset of frames.

Accordingly, the frame combination module 202 can utilize the pixel blending module 204 to blend the pixels included in the multiple frames within each stabilized subset based (at least in part) on calculating at least one of average pixel values for the pixels included in the multiple frames within each stabilized subset, maximum pixel values for the pixels included in the multiple frames within each stabilized subset, or minimum pixel values for the pixels included in the multiple frames within each stabilized subset. It should be appreciated that many variations are possible.

Figure 3:
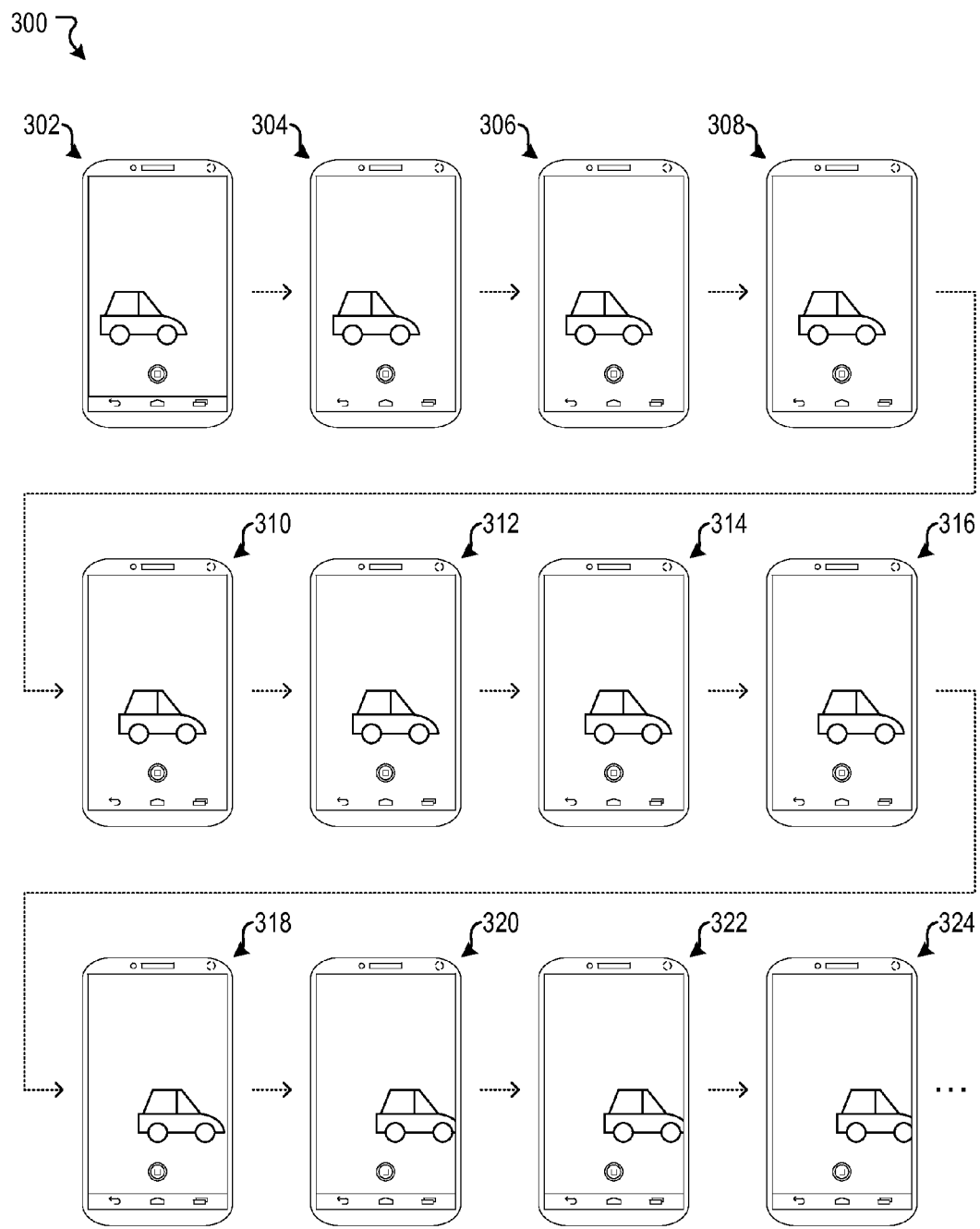
FIG. 3 illustrates an example scenario associated with combining multiple frames to produce media content with simulated exposure effects, according to an embodiment of the present disclosure.

FIG. 3 illustrates an example scenario 300 associated with combining multiple frames to produce media content with simulated exposure effects, according to an embodiment of the present disclosure. The example scenario 300 shows a plurality of stabilized subsets of frames. For example, the frames in the stabilized subsets can have been identified out of the original set of frames (captured by a computing device or system) based on the subset selection input and can have been stabilized based on the orientation-based image stabilization process, as discuss above.

In this example scenario 300, a user or a system setting can provide the subset selection input to indicate a quantity of four. As such, the plurality of stabilized subsets can include a first stabilized subset with the first frame 302, the second frame 304, the third frame 306, and the fourth frame 308, a second stabilized subset with the fifth frame 310 through the eighth frame 316, a third stabilized subset with frame 318 through frame 324, and so forth. Since the frames have been stabilized, undesirable movement such as unintentional camera shake can be reduced or eliminated, thereby allowing the stabilized frames to capture movements of objects. The example scenario 300 shows a moving car being captured by or represented in the plurality of stabilized subsets of frames.

Figure 4:
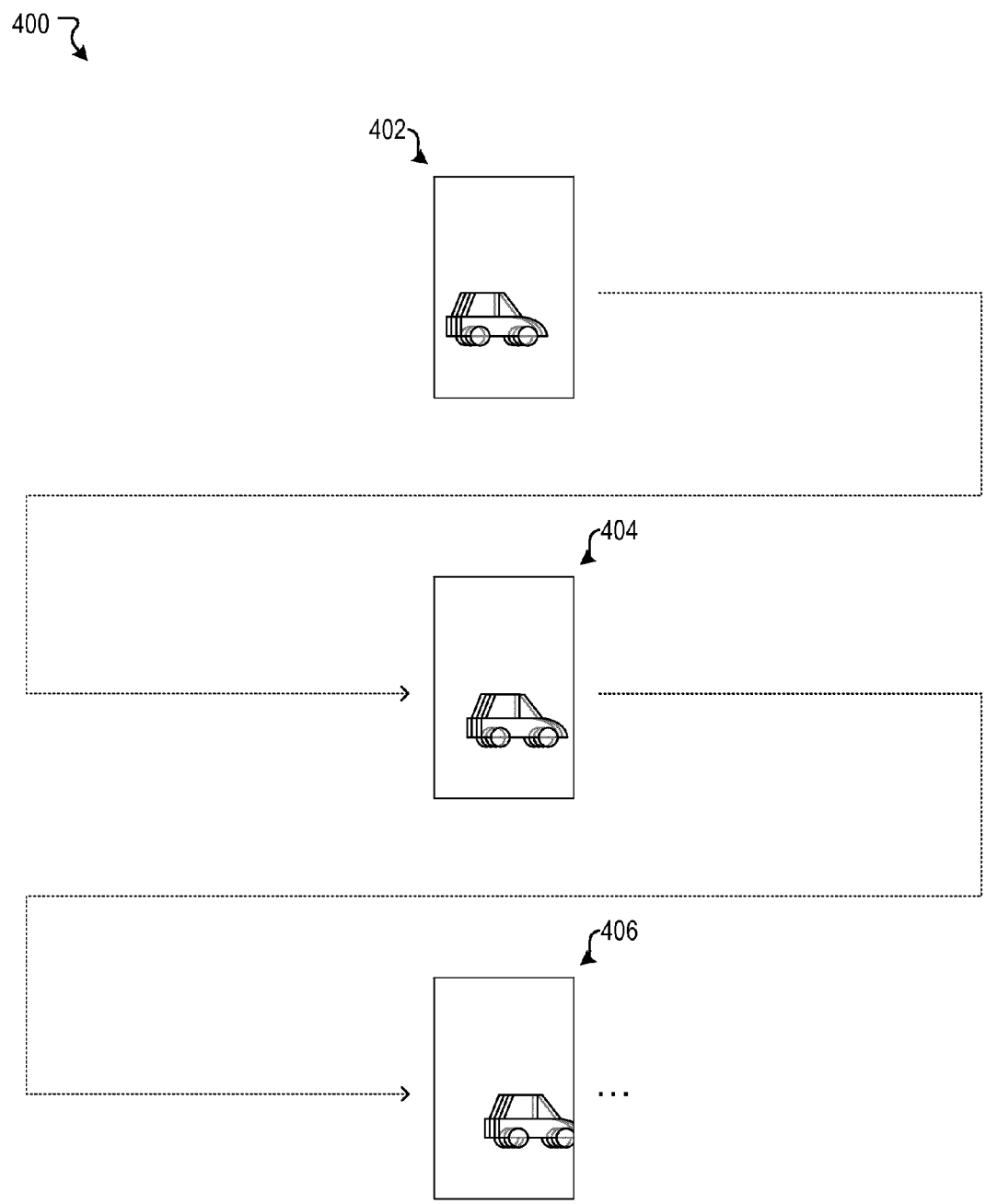
FIG. 4 illustrates an example scenario associated with combining multiple frames to produce media content with simulated exposure effects, according to an embodiment of the present disclosure.

FIG. 4 illustrates an example scenario 400 associated with combining multiple frames to produce media content with simulated exposure effects, according to an embodiment of the present disclosure. The example scenario 400 shows a plurality of combined frames produced based on combining multiple frames within each stabilized subset in the plurality of stabilized subsets from the example scenario 300 of FIG. 3.

In the example scenario 400 of FIG. 4, each stabilized subset of frames is utilized to produce a respective combined frame in the plurality of combined frames. In this example, the frames in the first stabilized subset (e.g., frames 302 through 308 from FIG. 3) are combined to produce a first combined frame 402. The frames in the second stabilized subset (e.g., frames 310 through 316) are combined to produce a second combined frame 404. The frames in the third stabilized subset (e.g., frames 318 through 324) are combined to produce a third combined frame 406. As shown in the example scenario 400, the combining of the multiple frames within each stabilized subset can cause one or more motion trails associated with the moving car to appear in each combined framed. Further, had the moving car's taillights been on, the combined frames would show light trails as well. Accordingly, this can simulate one or more effects of long exposure photography or time exposure photography. In addition, in some cases, a time-lapse media content item can be provided based on the plurality of combined frames (e.g., frames 402, 404, 406, etc.). It is contemplated that there can be many variations and other possibilities.

Figure 5:
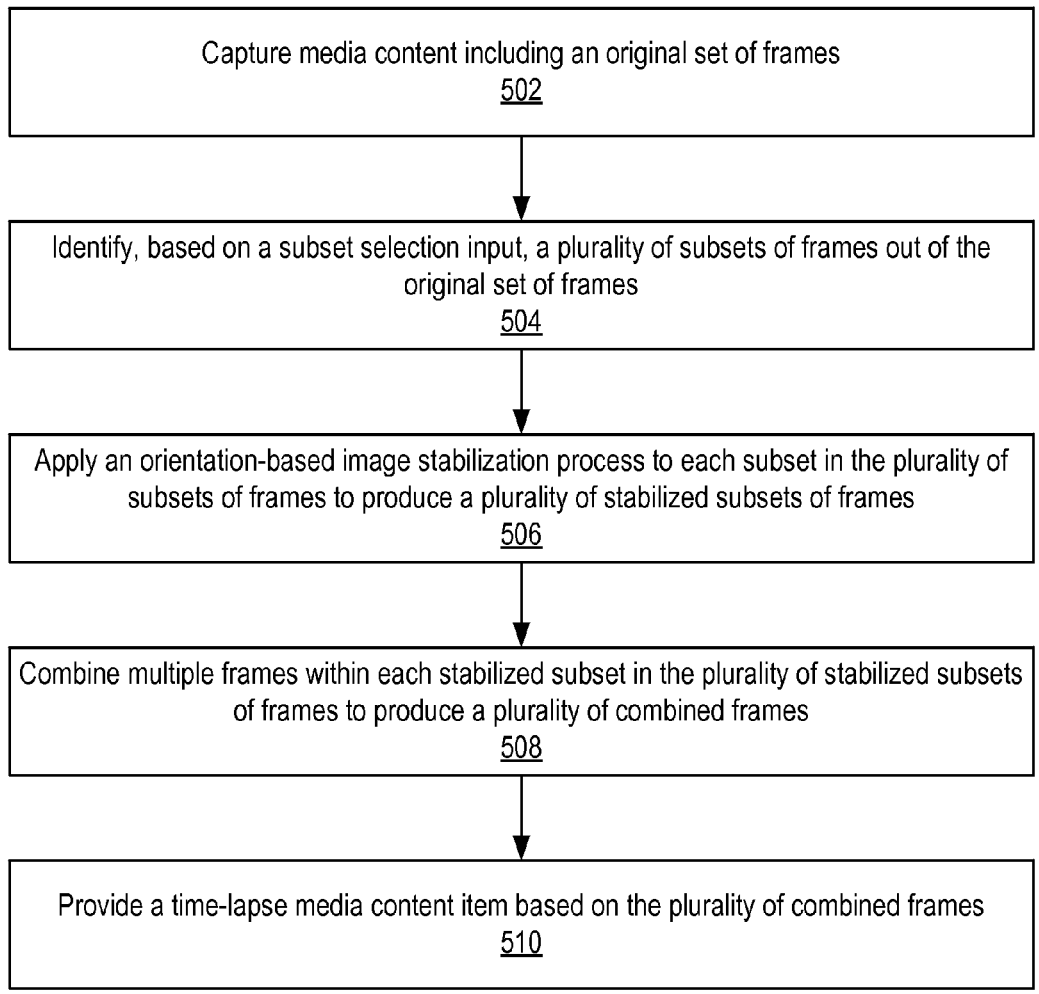
FIG. 5 illustrates an example method associated with combining multiple frames to produce media content with simulated exposure effects, according to an embodiment of the present disclosure.

FIG. 5 illustrates an example method 500 associated with improving stabilization in time-lapse media content, according to an embodiment of the present disclosure. It should be appreciated that there can be additional, fewer, or alternative steps performed in similar or alternative orders, or in parallel, within the scope of the various embodiments unless otherwise stated.

At block 502, the example method 500 can capture media content including an original set of frames. At block 504, the example method 500 can identify, based on a subset selection input, a plurality of subsets of frames out of the original set of frames. At block 506, the example method 500 can apply an orientation-based image stabilization process to each subset in the plurality of subsets of frames to produce a plurality of stabilized subsets of frames. At block 508, the example method 500 can combine multiple frames within each stabilized subset in the plurality of stabilized subsets of frames to produce a plurality of combined frames. Each stabilized subset of frames can be utilized to produce a respective combined frame in the plurality of combined frames. At block 510, the example method 500 can provide a time-lapse media content item based on the plurality of combined frames.

In some embodiments, the subset selection input can be received prior to at least one of the capturing of the media content including the original set of frames or the providing of the time-lapse media content item.

Figure 6:
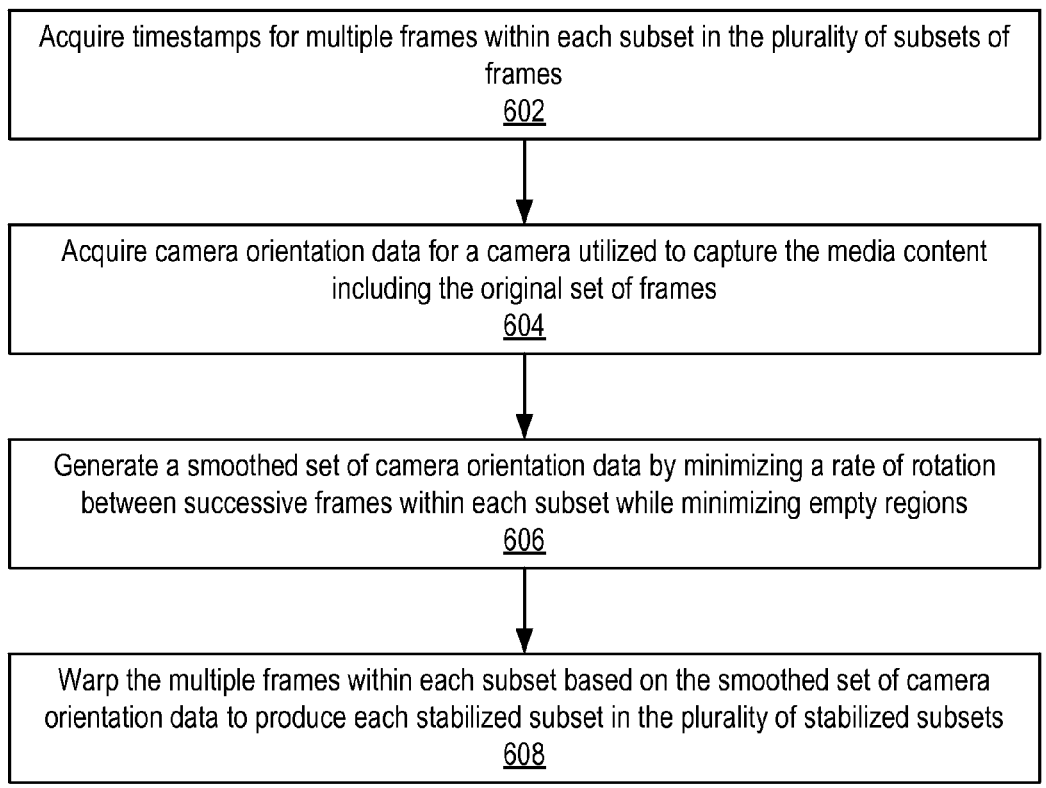
FIG. 6 illustrates an example method associated with combining multiple frames to produce media content with simulated exposure effects, according to an embodiment of the present disclosure.

FIG. 6 illustrates an example method 600 associated with improving stabilization in time-lapse media content, according to an embodiment of the present disclosure. Again, it should be understood that there can be additional, fewer, or alternative steps performed in similar or alternative orders, or in parallel, within the scope of the various embodiments unless otherwise stated.

At block 602, the example method 600 can acquire timestamps for multiple frames within each subset in the plurality of subsets of frames. At block 604, the example method 600 can acquire camera orientation data for a camera utilized to capture the media content including the original set of frames. The camera orientation data can be associated with the timestamps for the multiple frames within each subset. At block 606, the example method 600 can generate a smoothed set of camera orientation data by minimizing a rate of rotation between successive frames within each subset while minimizing empty regions below a threshold. At block 608, the example method 600 can warp the multiple frames within each subset based on the smoothed set of camera orientation data to produce each stabilized subset in the plurality of stabilized subsets of frames.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained. In another example, various embodiments of the present disclosure can learn, improve, and/or be refined over time.

Social Networking System—Example Implementation

Figure 7:
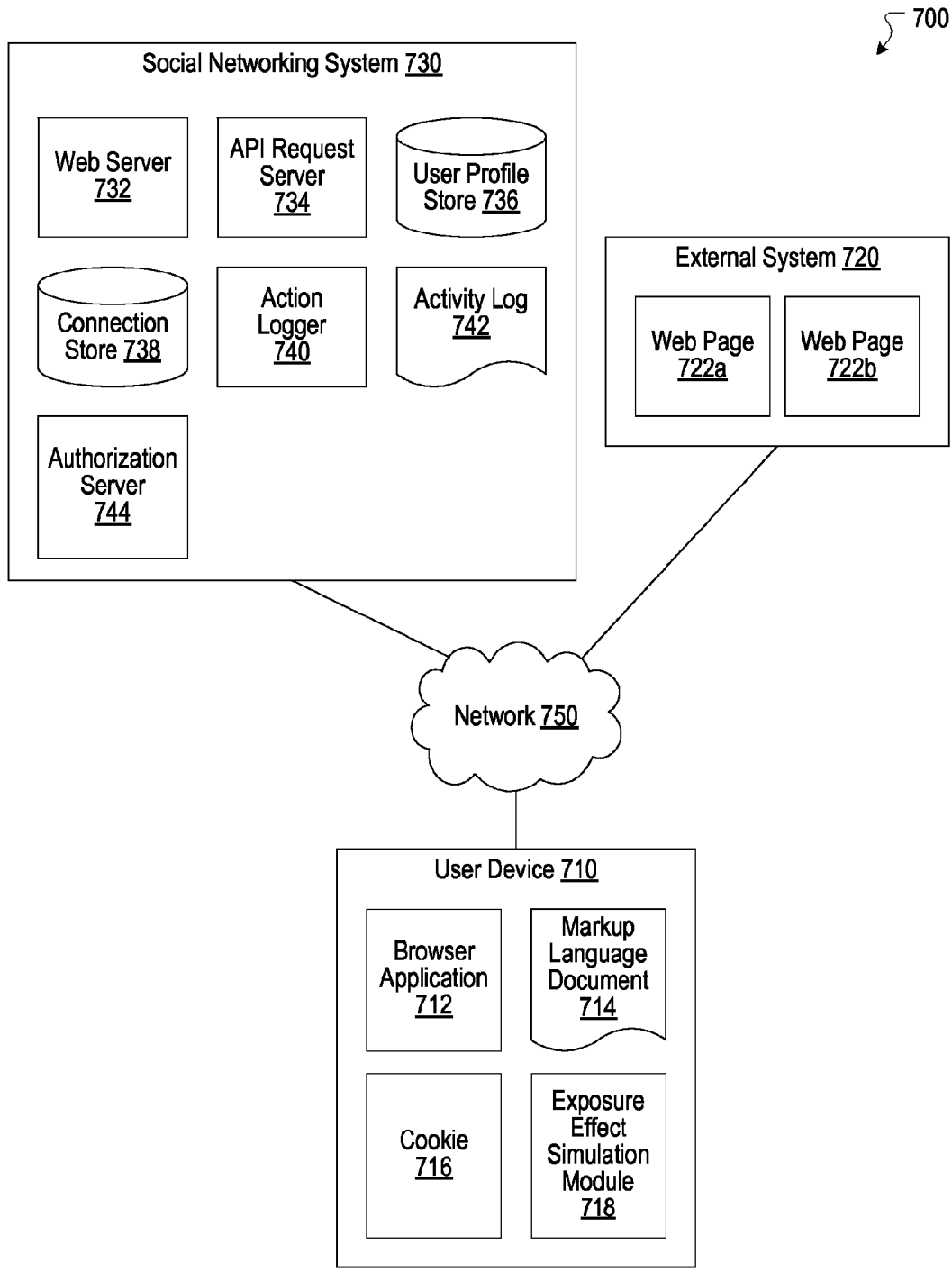
FIG. 7 illustrates a network diagram of an example system that can be utilized in various scenarios, according to an embodiment of the present disclosure.

FIG. 7 illustrates a network diagram of an example system 700 that can be utilized in various scenarios, in accordance with an embodiment of the present disclosure. The system 700 includes one or more user devices 710, one or more external systems 720, a social networking system (or service) 730, and a network 750. In an embodiment, the social networking service, provider, and/or system discussed in connection with the embodiments described above may be implemented as the social networking system 730. For purposes of illustration, the embodiment of the system 700, shown by FIG. 7, includes a single external system 720 and a single user device 710. However, in other embodiments, the system 700 may include more user devices 710 and/or more external systems 720. In certain embodiments, the social networking system 730 is operated by a social network provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices (or systems) that can receive input from a user and transmit and receive data via the network 750. In one embodiment, the user device 710 is a conventional computer system executing, for example, a Microsoft Windows compatible operating system (OS), Apple OS X, and/or a Linux distribution. In another embodiment, the user device 710 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or Unity™ applications, the SilverLight™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 730 may be administered, managed, or controlled by an operator. The operator of the social networking system 730 may be a human being, an automated application, or a series of applications for managing content, regulating policies, and collecting usage metrics within the social networking system 730. Any type of operator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, and an authorization server 744. In an embodiment of the invention, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment of the invention, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, Flash, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

In some embodiments, the user device 710 can include an exposure effect simulation module 718. The exposure effect simulation module 718 can, for example, be implemented as the exposure effect simulation module 102 of FIG. 1. Other features of the exposure effect simulation module 710 are discussed herein in connection with the exposure effect simulation module 102.

Hardware Implementation

Figure 8:
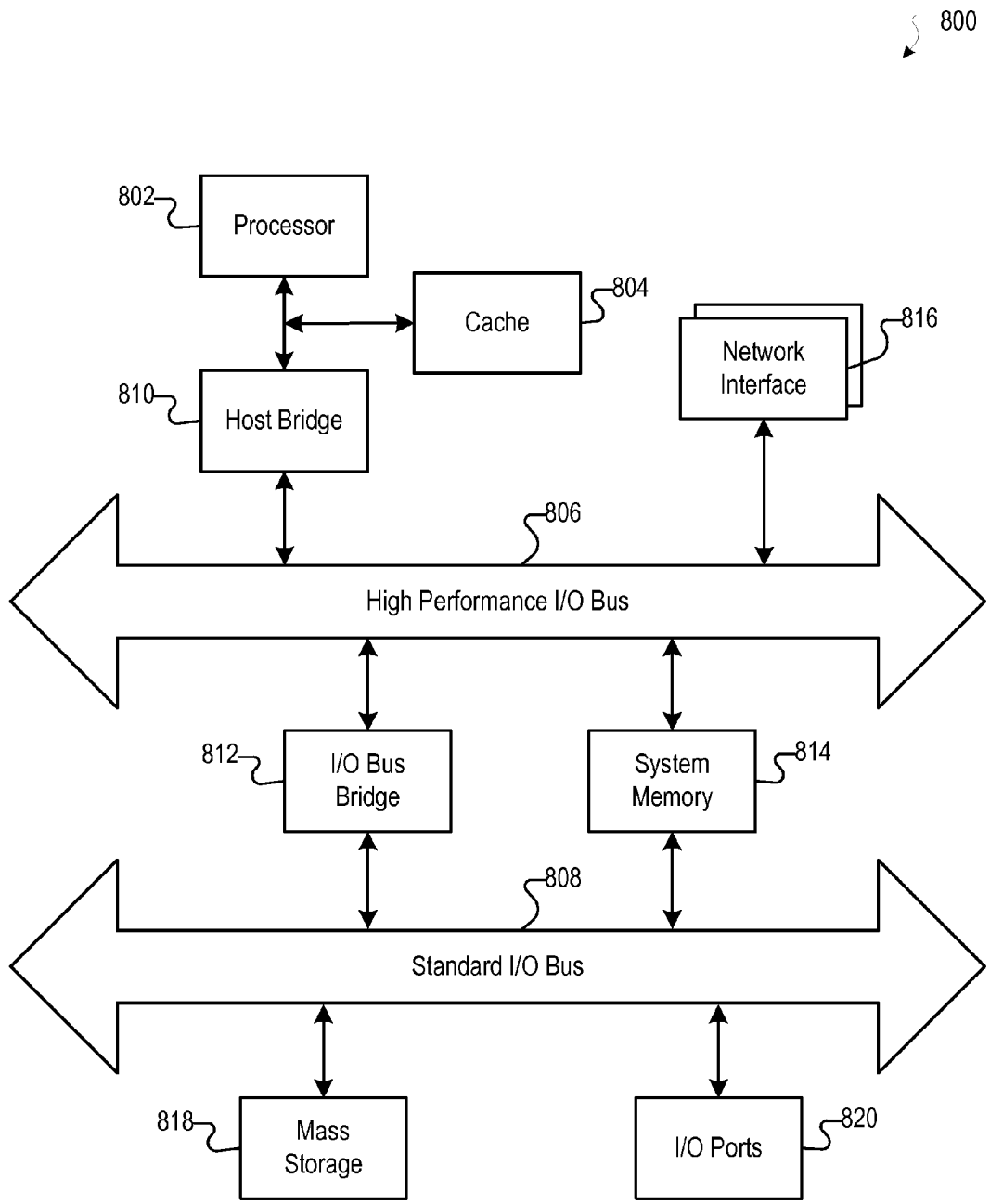
FIG. 8 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment of the invention. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment of the invention, the computer system 800 may be the social networking system 730, the user device 710, and the external system 820, or a component thereof. In an embodiment of the invention, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and one or more network interfaces 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments of the invention may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Moreover, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    capturing, by a computing system, media content including an original set of frames;
    identifying, by the computing system, based on a subset selection input, a plurality of subsets of frames out of the original set of frames;
    applying, by the computing system, an orientation-based image stabilization process to each subset in the plurality of subsets of frames to produce a plurality of stabilized subsets of frames, wherein the applying the orientation-based image stabilization process comprises:
        minimizing a rate of rotation between successive frames within each subset while minimizing empty regions below a threshold; and
        applying an adaptive zoom that adjusts an amount of at least one of zooming or cropping of frames in each subset based on camera orientation data;
    combining, by the computing system, multiple frames within each stabilized subset in the plurality of stabilized subsets of frames to produce a plurality of combined frames, wherein each stabilized subset of frames is utilized to produce a respective combined frame in the plurality of combined frames, and wherein combining the multiple frames within each stabilized subset to produce the plurality of combined frames is based on pixel blending a respective entirety of each frame in the multiple frames; and
    providing, by the computing system, a time-lapse media content item based on the plurality of combined frames.

2. The computer-implemented method of claim 1, wherein the applying of the orientation-based image stabilization process to each subset in the plurality of subsets of frames to produce the plurality of stabilized subsets of frames further comprises:
    acquiring timestamps for multiple frames within each subset in the plurality of subsets of frames;
    acquiring the camera orientation data, the camera orientation data associated with a camera utilized to capture the media content including the original set of frames and associated with the timestamps for the multiple frames within each subset;

generating a smoothed set of camera orientation data by minimizing the rate of rotation between the successive frames within each subset while minimizing the empty regions below the threshold; and warping the multiple frames within each subset based on the smoothed set of camera orientation data to produce each stabilized subset in the plurality of stabilized subsets of frames.

3. The computer-implemented method of claim 2, wherein the orientation-based image stabilization process causes the multiple frames within each subset to be aligned relative to at least one of a respective first frame of the multiple frames within each subset or a specified alignment.

4. The computer-implemented method of claim 2, wherein the camera incurs undesirable motion while capturing the media content including the original set of frames, and wherein the orientation-based image stabilization process reduces instability, caused by the undesirable motion, with respect to each subset in the plurality of subsets of frames.

5. The computer-implemented method of claim 1, wherein the subset selection input indicates a quantity of frames, and wherein the subset selection input causes each subset in the plurality of subsets to include the quantity of frames.

6. The computer-implemented method of claim 5, wherein the quantity of frames is greater than one.

7. The computer-implemented method of claim 1, wherein a moving object is represented in at least one stabilized subset in the plurality of stabilized subsets, wherein the combining of the multiple frames within each stabilized subset comprises combining multiple frames within the at least one stabilized subset, and wherein the combining of the multiple frames within the at least one stabilized subset causes one or more motion trails associated with the moving object to appear in a combined frame produced based on the at least one stabilized subset.

8. The computer-implemented method of claim 1, wherein the combining of the multiple frames within each stabilized subset in the plurality of stabilized subsets of frames to produce the plurality of combined frames further comprises:

blending pixels included in the multiple frames within each stabilized subset.

9. The computer-implemented method of claim 8, wherein the blending of the pixels included in the multiple frames within each stabilized subset further comprises:

calculating at least one of average pixel values for the pixels included in the multiple frames within each stabilized subset, maximum pixel values for the pixels included in the multiple frames within each stabilized subset, or minimum pixel values for the pixels included in the multiple frames within each stabilized subset.

10. The computer-implemented method of claim 1, wherein the subset selection input corresponds to at least one of a user command or a system setting, and wherein the subset selection input is received prior to at least one of the capturing of the media content including the original set of frames or the providing of the time-lapse media content item.

11. A system comprising:
at least one processor; and
a memory storing instructions that, when executed by the at least one processor, cause the system to perform:
capturing media content including an original set of frames;

identifying, based on a subset selection input, a plurality of subsets of frames out of the original set of frames;

applying an orientation-based image stabilization process to each subset in the plurality of subsets of frames to produce a plurality of stabilized subsets of frames wherein the applying the orientation-based image stabilization process comprises:

minimizing a rate of rotation between successive frames within each subset while minimizing empty regions below a threshold; and applying an adaptive zoom that adjusts an amount of at least one of zooming or cropping of frames in each subset based on camera orientation data;

combining multiple frames within each stabilized subset in the plurality of stabilized subsets of frames to produce a plurality of combined frames, wherein each stabilized subset of frames is utilized to produce a respective combined frame in the plurality of combined frames, and wherein combining the multiple frames within each stabilized subset to produce the plurality of combined frames is based on pixel blending a respective entirety of each frame in the multiple frames; and providing a time-lapse media content item based on the plurality of combined frames.

12. The system of claim 11, wherein the applying of the orientation-based image stabilization process to each subset in the plurality of subsets of frames to produce the plurality of stabilized subsets of frames further comprises:

acquiring timestamps for multiple frames within each subset in the plurality of subsets of frames;

acquiring the camera orientation data, the camera orientation data being-associated with a camera utilized to capture the media content including the original set of frames and associated with the timestamps for the multiple frames within each subset;

generating a smoothed set of camera orientation data by minimizing the rate of rotation between the successive frames within each subset while minimizing the empty regions below the threshold; and warping the multiple frames within each subset based on the smoothed set of camera orientation data to produce each stabilized subset in the plurality of stabilized subsets of frames.

13. The system of claim 11, wherein a moving object is represented in at least one stabilized subset in the plurality of stabilized subsets, wherein the combining of the multiple frames within each stabilized subset comprises combining multiple frames within the at least one stabilized subset, and wherein the combining of the multiple frames within the at least one stabilized subset causes one or more motion trails associated with the moving object to appear in a combined frame produced based on the at least one stabilized subset.

14. The system of claim 11, wherein the combining of the multiple frames within each stabilized subset in the plurality of stabilized subsets of frames to produce the plurality of combined frames further comprises:

blending pixels included in the multiple frames within each stabilized subset.

15. The system of claim 14, wherein the blending of the pixels included in the multiple frames within each stabilized subset further comprises:

calculating at least one of average pixel values for the pixels included in the multiple frames within each stabilized subset, maximum pixel values for the pixels included in the multiple frames within each stabilized subset, or minimum pixel values for the pixels included in the multiple frames within each stabilized subset.

16. A non-transitory computer-readable storage medium including instructions that, when executed by at least one processor of a computing system, cause the computing system to perform:

capturing media content including an original set of frames;

identifying, based on a subset selection input, a plurality of subsets of frames out of the original set of frames;

applying an orientation-based image stabilization process to each subset in the plurality of subsets of frames to produce a plurality of stabilized subsets of frames, wherein the applying the orientation-based image stabilization process comprises:

minimizing a rate of rotation between successive frames within each subset while minimizing empty regions below a threshold; and applying an adaptive zoom that adjusts an amount of at least one of zooming or cropping of frames in each subset based on camera orientation data;

combining multiple frames within each stabilized subset in the plurality of stabilized subsets of frames to produce a plurality of combined frames, wherein each stabilized subset of frames is utilized to produce a respective combined frame in the plurality of combined frames, and wherein combining the multiple frames within each stabilized subset to produce the plurality of combined frames is based on pixel blending a respective entirety of each frame in the multiple frames; and providing a time-lapse media content item based on the plurality of combined frames.

17. The non-transitory computer-readable storage medium of claim 16, wherein the applying of the orientation-based image stabilization process to each subset in the plurality of subsets of frames to produce the plurality of stabilized subsets of frames further comprises:

acquiring timestamps for multiple frames within each subset in the plurality of subsets of frames;

acquiring the camera orientation data, the camera orientation data associated with a camera utilized to capture the media content including the original set of frames and associated with the timestamps for the multiple frames within each subset;

generating a smoothed set of camera orientation data by minimizing the rate of rotation between the successive frames within each subset while minimizing the empty regions below the threshold; and warping the multiple frames within each subset based on the smoothed set of camera orientation data to produce each stabilized subset in the plurality of stabilized subsets of frames.

18. The non-transitory computer-readable storage medium of claim 16, wherein a moving object is represented in at least one stabilized subset in the plurality of stabilized subsets, wherein the combining of the multiple frames within each stabilized subset comprises combining multiple frames within the at least one stabilized subset, and wherein the combining of the multiple frames within the at least one stabilized subset causes one or more motion trails associated with the moving object to appear in a combined frame produced based on the at least one stabilized subset.

19. The non-transitory computer-readable storage medium of claim 16, wherein the combining of the multiple frames within each stabilized subset in the plurality of stabilized subsets of frames to produce the plurality of combined frames further comprises:

blending pixels included in the multiple frames within each stabilized subset.

20. The non-transitory computer-readable storage medium of claim 19, wherein the blending of the pixels included in the multiple frames within each stabilized subset further comprises:

calculating at least one of average pixel values for the pixels included in the multiple frames within each stabilized subset, maximum pixel values for the pixels included in the multiple frames within each stabilized subset, or minimum pixel values for the pixels included in the multiple frames within each stabilized subset.

* * * * *